United States Patent
Pialot et al.

(10) Patent No.: US 11,090,889 B2
(45) Date of Patent: Aug. 17, 2021

(54) CURING MEMBRANE FOR A TIRE

(71) Applicant: COMPAGNIE GENERALE DES ETABLISSEMENTS MICHELIN, Clermont-Ferrand (FR)

(72) Inventors: Frederic Pialot, Clermont-Ferrand (FR); Alain Faugeras, Clermont-Ferrand (FR); Jose Merino Lopez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/970,103

(22) PCT Filed: Feb. 13, 2019

(86) PCT No.: PCT/FR2019/050309
§ 371 (c)(1),
(2) Date: Aug. 14, 2020

(87) PCT Pub. No.: WO2019/158852
PCT Pub. Date: Aug. 22, 2019

(65) Prior Publication Data
US 2020/0406565 A1    Dec. 31, 2020

(30) Foreign Application Priority Data
Feb. 15, 2018 (FR) .................................. 1851269

(51) Int. Cl.
*B29D 30/06* (2006.01)
*B29C 33/10* (2006.01)
*B29C 33/42* (2006.01)

(52) U.S. Cl.
CPC .......... *B29D 30/0654* (2013.01); *B29C 33/10* (2013.01); *B29C 33/42* (2013.01); *B29D 2030/0655* (2013.01)

(58) Field of Classification Search
CPC .................... B29D 30/0654; B29D 2030/0655
See application file for complete search history.

(56) References Cited

U.S. PATENT DOCUMENTS 3,143,155 A * 8/1964 Knox .................. B60C 13/00
                                                    152/450
3,970,416 A * 7/1976 Mattson ............. B29D 30/0654
                                                     425/52
(Continued)

FOREIGN PATENT DOCUMENTS

EP    2 228 190 A1    9/2010
JP    6-143288    *  5/1994
(Continued)

OTHER PUBLICATIONS

International Search Report dated May 7, 2019, in corresponding PCT/FR2019/050309 (5 pages).

*Primary Examiner* — James P Mackey
(74) *Attorney, Agent, or Firm* — Venable LLP

(57) ABSTRACT

A curing bladder (7) for a tire has a shape of revolution about a central axis and a flexible wall made of crosslinked rubber, the external surface of which is intended to come into contact with the internal surface of a green tire during curing, the external surface having a relief structure having a plurality of air evacuation channels. The relief structure has first channels forming air evacuation grooves (100) arranged at a distance of between 2 and 5 mm, and having a depth of between 0.4 and 1 mm, two adjacent grooves defining, between one another, an inter-groove zone (500) having second channels forming air channelling furrows (1000) made so as to communicate with one another and (Continued)

with at least one of the grooves (100), the furrows each having a depth of between 0.01 and 0.4 mm and being situated at a distance of between 0.2 and 1 mm from one another.

9 Claims, 3 Drawing Sheets

(56) References Cited

U.S. PATENT DOCUMENTS

| | | | | |
|---|---|---|---|---|
| 3,989,429 | A | * | 11/1976 | Mattson ............. B29D 30/0654 |
| | | | | 425/52 |
| 4,082,490 | A | * | 4/1978 | Chateau ................. B29C 33/10 |
| | | | | 425/412 |
| 4,531,902 | A | * | 7/1985 | Stuhldreher ............ B29C 33/10 |
| | | | | 249/142 |
| 8,079,839 | B2 | * | 12/2011 | Nemoto ................. B29C 33/10 |
| | | | | 425/52 |
| 9,073,277 | B2 | * | 7/2015 | Lo Presti ................ B60C 13/02 |
| 2011/0120612 | A1 | | 5/2011 | Nemoto |
| 2012/0073725 | A1 | | 3/2012 | Lo Presti et al. |
| 2014/0205695 | A1 | | 7/2014 | Klisan |
| 2015/0336344 | A1 | | 11/2015 | Lo Presti et al. |
| 2017/0326826 | A1 | | 11/2017 | Hinc et al. |

FOREIGN PATENT DOCUMENTS

| | | | |
|---|---|---|---|
| JP | 6-143288 | A | 5/1994 |
| JP | 2005-280259 | A | 10/2005 |
| JP | 2005-280260 | A | 10/2005 |
| JP | 2011-255597 | * | 12/2011 |
| JP | 2014-91272 | A | 5/2014 |
| WO | 2010/143094 | A1 | 12/2010 |

\* cited by examiner

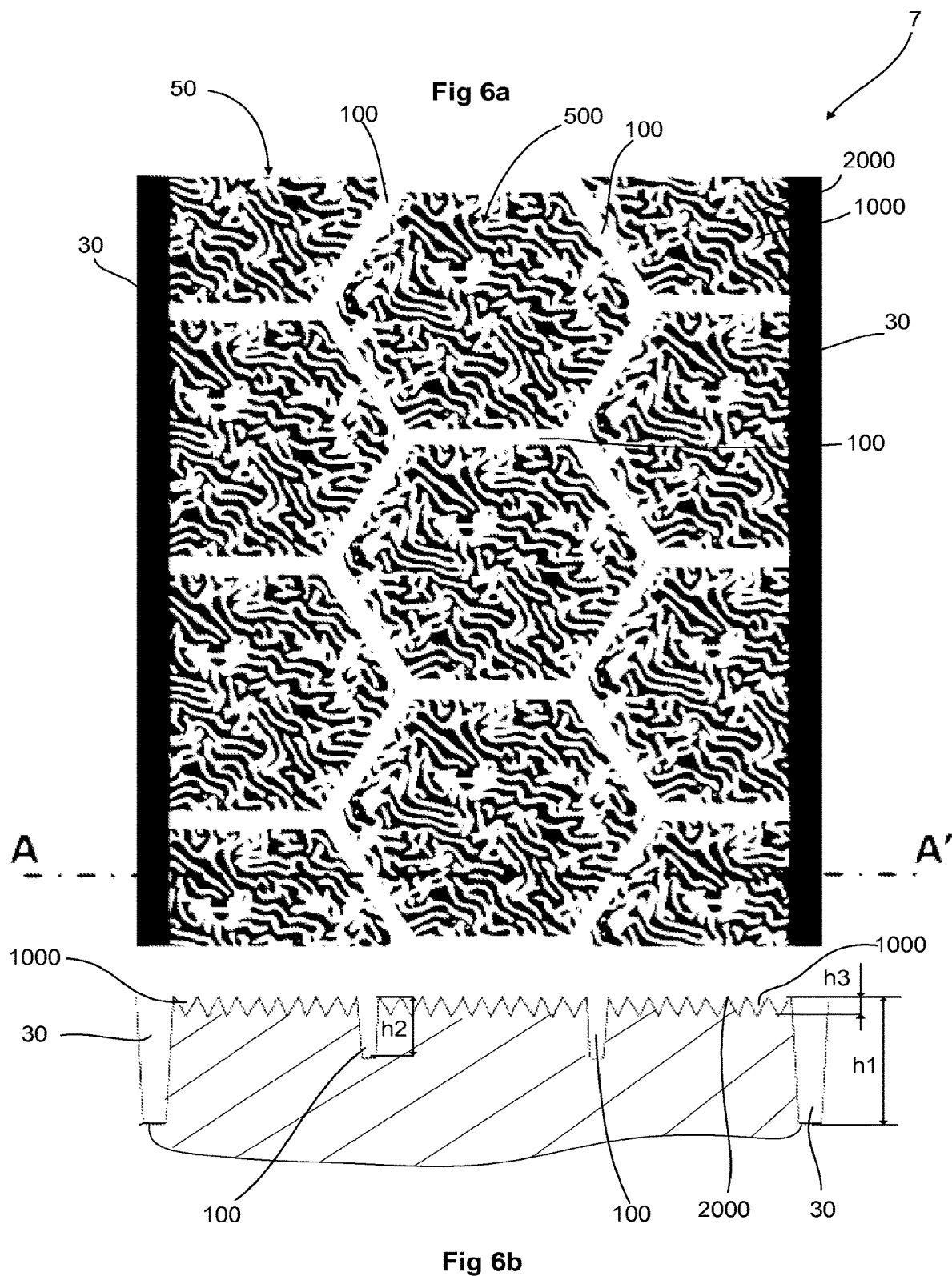

CURING MEMBRANE FOR A TIRE

BACKGROUND

The present invention relates to the field of tyres and concerns curing bladders used in processes for manufacturing tyres.

Tyres are usually obtained by moulding and vulcanizing a green tyre inside a curing mould. The external walls of the green tyre are pressed against the rigid internal walls of the curing mould with the aid of a flexible curing bladder, which opens out inside the green tyre under the effect of a pressurized fluid. The tread pattern on the mould inserts and that on the shells is thus imprinted onto the green casing, which is vulcanized with the aid of heat. The curing bladder opens out inside the green casing prior to curing and folds up at the end of curing; it has to withstand mechanical stresses, thermal stresses and wear, and it has to be able to come away easily from the cured tyre.

A green form of tyre is generally obtained by wrapping and successively laying various elastomer-based components, in particular plies, reinforced or non-reinforced strips, bead wires and the protectors thereof, on a rotary tyre-building drum. During building, air is trapped between the different layers and components of the green tyre and escapes when the green tyre is subjected to the vulcanization pressure. For this purpose, the vulcanizing mould has venting orifices for allowing through the air that emerges at the interface between the external surface of the green tyre and the rigid parts of the curing mould. For its part, the internal surface of the green tyre is in contact with a flexible curing bladder that is sealed since it contains the heat transfer fluid that also pressurizes and opens out the bladder. As in the case of the external surface of the green tyre, air trapped between the internal surface of the tyre and the curing bladder has to be evacuated in order to avoid the occurrence of air pockets which, when present, can bring about defects on the internal surface of the cured tyre. These defects are generally bulges present on the internal surface of the tyre, or even in the internal structure of the tyre, resulting in appearance defects, in the loss of performance of the tyre, or even in the decohesion of the internal layers of the tyre.

In order to allow the evacuation of the air present between the internal surface of the tyre and the curing bladder, the latter is provided with air evacuation slots. These slots are often made in the form of helical channels disposed at regular intervals on the external surface of the bladder, in the circumferential direction thereof, between the central zone defined by the equatorial plane of the bladder and the beads for securing it in the press. Specifically, while the curing bladder opens out inside the green tyre, it initially bears against an annular part situated in the equatorial plane of the green tyre, and the striations channel the air present between the green tyre and the bladder towards the beads of the latter and it is evacuated via venting orifices in the parts of the mould. However, in order to allow proper evacuation of the air, these slots have to be fairly deep. Furthermore, the bladder has to have the smallest possible thickness in order to be able to transmit heat energy to the green tyre. It has been found, however, that such deep slots weaken the bladder and reduce the service life thereof.

To remedy this problem, the document JP2005280259 proposes a curing bladder having circumferential slots on its external surface, wherein the region between two adjacent slots is divided into a plurality of hexagonal islands that are separated from one another by fine notches. While the bladder opens out, the presence of the notches ensures a fairly uniform deformation of the bladder and reduces the risk of cracks therein, even for bladders having a fairly small thickness. However, the region of contact between the green tyre and the flat hexagonal islands is fairly large and air pockets present in the region of the islands are not evacuated satisfactorily.

The document WO2010/143094 proposes a solution to remedy this problem, said solution consisting in using a bladder similar to the one in the previous document in combination with a green tyre, the internal layer of which is made by laying and wrapping narrow strips. Thus, on account of its construction, the green tyre participates in the evacuation of the air trapped between its internal surface and the external surface of the curing bladder. Although it admittedly has a better air evacuation capacity than that of the bladder of the previous document, this solution involves a particular construction of the green tyre and, consequently, suitable building devices, elastomeric components, etc.

It is an objective of the invention to remedy the drawbacks of the abovementioned documents and to propose a solution for improving the air evacuation capacity of a curing bladder, without negative consequences on the service life thereof, in order to make it possible to improve the quality of vulcanization of a green tyre, independently of the green tyre manufacturing method.

SUMMARY

This objective has been achieved by the invention, which proposes a curing bladder for a tyre, having a shape of revolution about a central axis and having a flexible wall made of crosslinked rubber, the external surface of which is intended to come into contact with the internal surface of a green tyre during curing, the external surface having a relief structure having a plurality of air evacuation channels, characterized in that said relief structure has first channels forming air evacuation grooves arranged at a distance $p2$ of between 2 and 5 mm from one another, and having a depth $h2$ of between 0.4 and 1 mm, two adjacent grooves defining, between one another, an inter-groove zone having second channels forming air channelling furrows made so as to communicate with one another and with at least one of the grooves, the furrows each having a depth $h3$ of between 0.01 and 0.4 mm and being situated at a distance of between 0.2 and 1 mm from one another.

According to the invention, air evacuation channels are thus provided on the entire external surface of the useful part of the bladder, the dimensions of which are chosen such that good drainage of the air can be effected. More particularly, by providing furrows that are very fine and very close together, not only will it always be possible to have a channel that channels an air bubble at any point, but the surface area of the relief of the bladder is also significantly increased and, as a result, so is the volume of air channelled by the bladder.

In addition, by having numerous very fine furrows that are close together communicate with grooves that are deeper and more spaced-apart, but less numerous, progressive evacuation of the volume of air captured in the furrows is obtained. This makes it possible to have a volume of air that changes over time and easier evacuation of the air drained. The volume of air is therefore locally (at the furrow) low, but overall (at the bladder) very high.

With the relief structure of the invention, the included air is drained at any point, the volume thereof gradually increasing over time, making it possible to evacuate the air progressively and rapidly.

Preferably, an inter-groove zone comprises furrows and ribs made in the form of curved lines intermingled with one another. This makes it possible to distribute the furrows and the ribs well over the surface of the inter-groove zone.

Advantageously, the sum of the areas of the furrows is greater than that of the ribs in an inter-groove zone. This makes it possible to have a large capture volume at the furrows.

In a first embodiment, the grooves are rectilinear and mutually parallel, being arranged at one and the same distance p2 from one another. Such parallel rectilinear grooves arranged at a regular distance constitute channels for collecting the air coming from furrows situated between two adjacent grooves and ensure progressive drainage of the volume of air coming from the furrows.

In a second embodiment, the grooves define a honeycomb structure, said honeycomb structure being made up of a plurality of regular hexagons with a height equal to p2. Such a honeycomb structure or hexagonal tiling of the surface makes it possible to properly cover the surface of the bladder, the regular hexagon having the largest possible area for a given perimeter.

Preferably, the bladder comprises a plurality of mutually parallel slots that are arranged at a predetermined distance p1 from one another, where p1>p2, and are made so as to communicate with at least one groove. Thus, the slots, which are deeper and less numerous than the grooves, make it possible to realize progressive drainage of the air received from the grooves.

Advantageously, said slots extend between the two beads of the bladder or between a bead and a zone close to the equatorial plane of the bladder. This makes it possible to channel the air in the region of the beads, from where it is evacuated via the vents made in the facing mould parts.

A further subject of the invention is a process for manufacturing a curing bladder using a vulcanizing process in a vulcanizing press having a fixed rigid core and two movable rigid shells, wherein said grooves and said furrows are obtained by at least one chemical etching operation on said core.

Another subject of the invention is a process for curing a green tyre in a curing mould having rigid moulding parts and with the aid of a flexible curing bladder, characterized in that the green tyre cooperates with a bladder according to the invention during curing.

BRIEF DESCRIPTION OF THE DRAWINGS

The invention will be understood better from the rest of the description, which is based on the following figures:

FIG. 6a is a view on a larger scale of a part of the surface of a curing bladder according to a preferred embodiment of the invention, and FIG. 6b is a cross-sectional view taken on the plane A-A' in FIG. 6a.

DETAILED DESCRIPTION

In the various figures, elements that are identical or similar bear the same references. Their description is therefore not systematically repeated.

Figure 1:
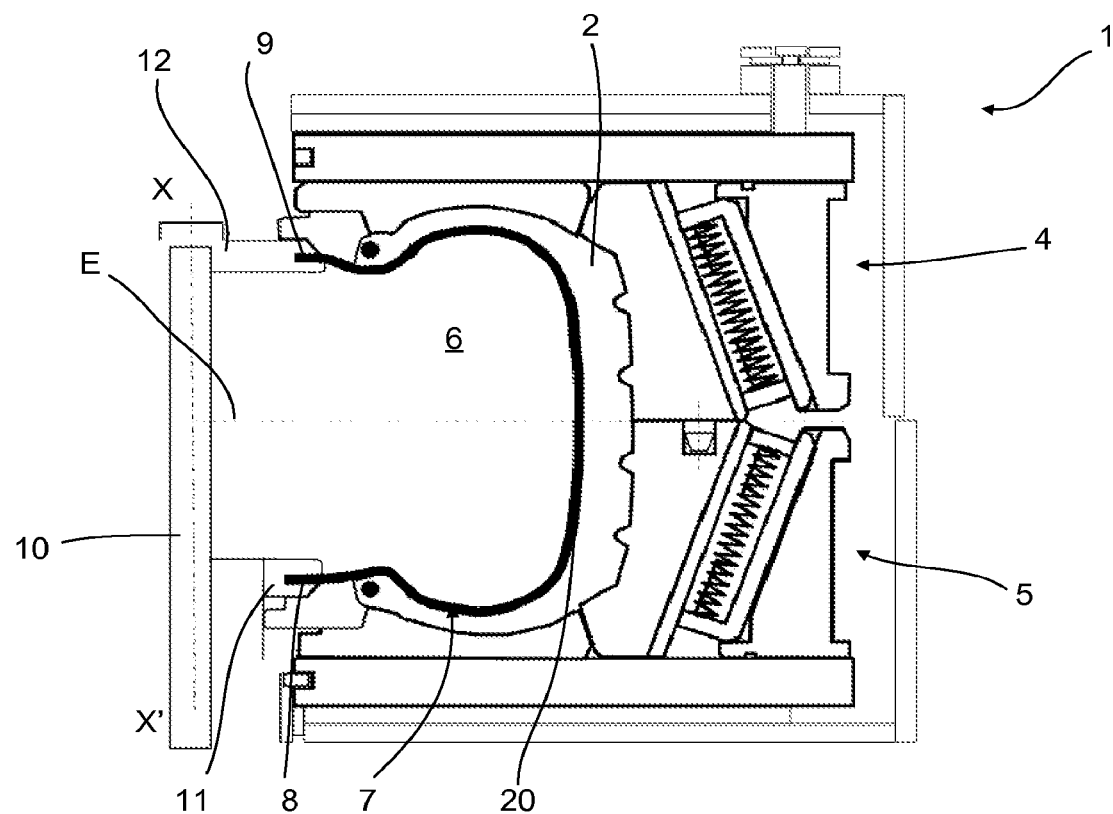
FIG. 1 is a view in axial cross section of a tyre curing half-mould having a bladder according to the invention.

FIG. 1 schematically illustrates half of a curing mould 1 for tyres, the mould being illustrated in a closed position, which corresponds to the operation of curing a green tyre 2. The mould illustrated in FIG. 1 is of the type having two moulding parts 4 and 5 that come into contact with one another at the equatorial plane E of the green tyre. The moulding parts comprise, in a known manner, several rigid parts that define, in the closed position of the mould, a moulding cavity 6, having a shape of revolution about the central axis X-X', the internal walls of which are made so as to define, after moulding, the external surface of the tyre. The moulding parts 4 and 5 are driven in movement by actuators provided for this purpose in order to close the moulding cavity 6 before starting the curing of the green tyre and to open it at the end of curing in order to be able to extract the cured tyre. Disposed at the centre of the mould 1 is a central rod 10 that supports two disc-like plates 11, 12 which are arranged at an axial distance from one another and in which a curing bladder 7 is fixed by its ends. The curing bladder 7 is fixed in a sealed manner by its ends or beads 8, 9 to the plates 11, 12, an intake, or evacuation, orifice for heat transfer fluid and which communicates in a sealed manner with the interior of the bladder being provided in the region of the plate 11.

In the following text, an axial direction denotes a direction parallel to the axis X-X', a radial direction denotes a direction perpendicular to the axis X-X', and a circumferential direction is a direction perpendicular to the radial direction.

The curing bladder 7 is an elastic and expandable hollow body used to mould and vulcanize a tyre in a curing mould supported, for its part, within a curing press. More particularly, the curing bladder 7 comprises a tubular body, the external surface of which forms a useful part 20 intended to come into contact with the internal surface of the green tyre, said useful part being delimited by end parts forming beads 8, 9 of the bladder. The external surface of the useful part 20 of the bladder has generally a relief structure, being provided for example with slots for evacuation of the air included between the curing bladder and the green tyre during curing.

In operation, the green tyre 2 is introduced into the moulding cavity 6 and is centred with respect to the axis X-X' of the mould. When pressurized heat transfer fluid is injected into the interior of the curing bladder 7, generally water vapour or air mixed with nitrogen, it expands and takes on a toroidal overall shape inside the tyre casing. When it opens out under the effect of the pressure of the heat transfer fluid, its flexible wall stretches until the green casing is pressed against the rigid walls of the curing mould. During this phase, the bladder has to evacuate the air included in the tyre during the building thereof. To this end, the surface of the bladder has a relief structure.

In order to manufacture a bladder, use is made, in a well-known manner, of a vulcanizing press having a core and two rigid, metal shells, the bladder being formed by the sleeve obtained by compression moulding a block of butyl rubber inserted between the shells and the core. The pattern on the external surface of the useful part of the bladder is imprinted on the core, which is a convex part that is easier to machine than the shells, which are concave parts. The bladder is thus vulcanized inside out, the relief structure being situated inside the bladder when it is manufactured.

After vulcanization, the bladder is extracted and turned right side out, like a sock, so as to bring its relief structure to the exterior of the bladder.

Figure 2:
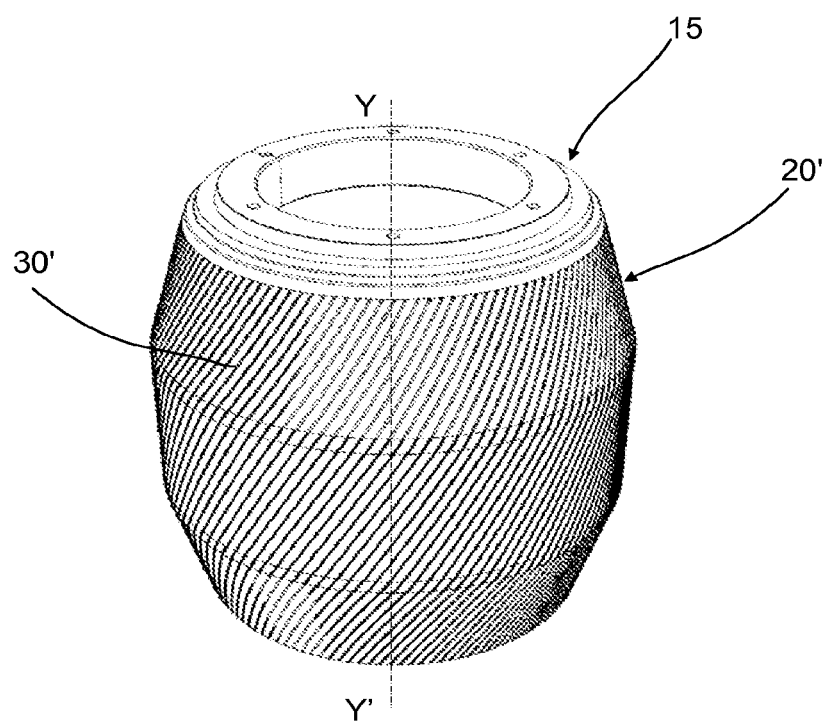
FIG. 2 is a perspective view of a core of a vulcanizing mould for a curing bladder according to the invention.

FIG. 2 illustrates an example of a core 15 used in a vulcanizing mould for a curing bladder 7 according to the invention; The core 15 has a shape of revolution about an axis Y-Y', this axis coinciding with that of the green tyre when the bladder and the green tyre are arranged in the curing mould 1.

The core 15 has an oval shape, and more particularly it has three parts of substantially equal axial length, namely two frontal frustoconical parts linked by a central cylindrical part. The external surface 20' of the core 15 constitutes the negative of the useful part 20 of the curing bladder 7 and, to this end, has splines 30' distributed uniformly over the external surface 20' of the core for moulding corresponding ribs in the curing bladder 7. While the bladder is being manufactured, the core moulds the ribs on its internal part, and the bladder is then turned right side out in order to be placed in the curing mould. Two adjacent ribs of the bladder define, between one another, an air evacuation slot 30, a plurality of slots 30 then being distributed uniformly over the external surface of the bladder. The splines 30' are oriented such that the slots of the bladder channel the air from the crown of the green tyre in the direction of the beads thereof. The splines 30' are generally inclined with respect to a meridian line of the core of the bladder, but can also be parallel thereto. In the example illustrated in FIG. 2, the splines 30' are mutually parallel and form an angle of about 30° with the meridian line of the core, and each spline starts from a first circumferential position of the core at one of its ends, which forms one of the beads of the bladder, and ends at a second circumferential position of the core at the opposite end. The slots 30 have a depth h1, a width l1 and are spaced apart at a spacing p1 on the circumference of the bladder.

Figure 3:
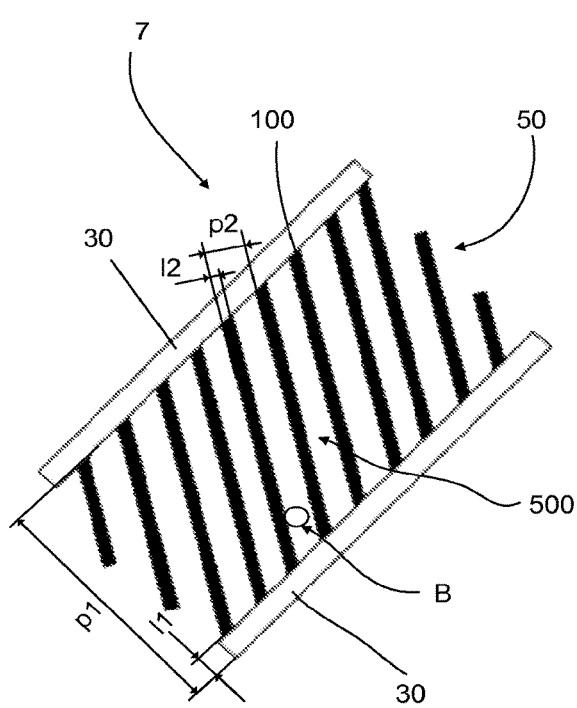
FIG. 3 is a view on a larger scale of a part of the external surface of the bladder according to a first embodiment of the invention.

According to the invention, the external surface of the useful part 20 of the curing bladder has a relief structure, the pattern of which varies with the dimensions of the relief, down to a scale of less than a millimetre. More particularly, in a first embodiment of the invention, and as can be seen in FIG. 3, the surface of an inter-slot zone 50 between two adjacent parallel slots 30 of the bladder is provided with air evacuation grooves 100. A plurality of grooves 100 is realized in the form of mutually parallel straight lines which intersect the slots 30. The grooves 100 thus communicate with the slots 30. The grooves 100 have a width l2, a depth h2 and are spaced apart at a spacing p2, where l2<l1, h2<h1 and p2<p1. In a variant (not illustrated in the drawings), the slots 30 are absent and a network of uniformly distributed parallel grooves 100 is present on the entire external surface of the useful part 20 of the curing bladder 7.

Figure 4:
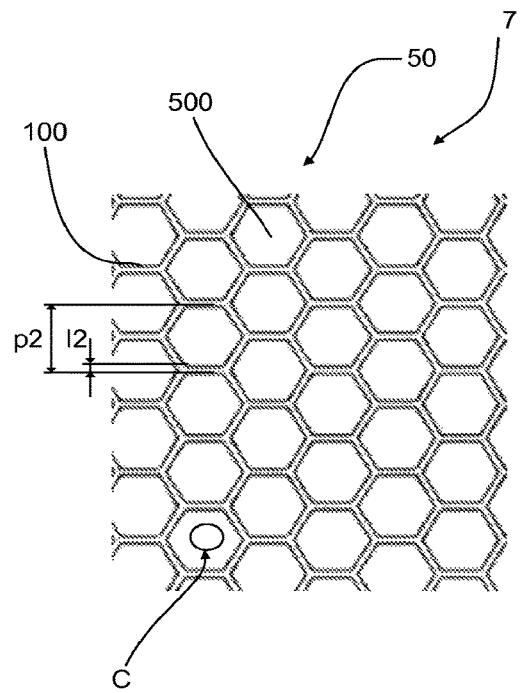
FIG. 4 is a view on a larger scale of a part of the external surface of the bladder according to a second embodiment of the invention.

In a second embodiment illustrated in FIG. 4, the air evacuation grooves 100 are realized in the form of hexagonal tiling or a honeycomb-type network. The grooves 100 therefore define, between one another, inter-groove zones 500 in the form of a regular hexagon. In another variant, as can be seen more clearly in FIGS. 6a and 6b, the grooves 100 communicate with one another and with slots 30. In another embodiment variant of the invention (not illustrated in the drawings), the slots 30 are absent, the network of grooves 100 in the form of a honeycomb being present on the entire external surface of the useful part 20 of the curing bladder 7.

Figure 5A:
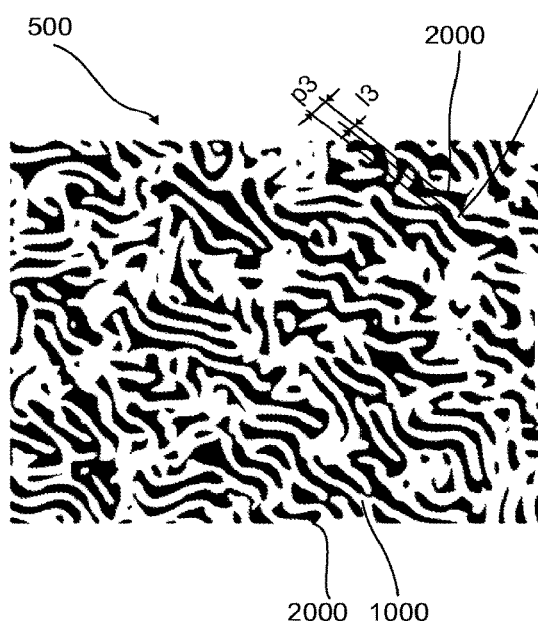
FIGS. 5a and 5b are views on a larger scale of the details B and C in FIGS. 3 and 4.
Figure 5B:
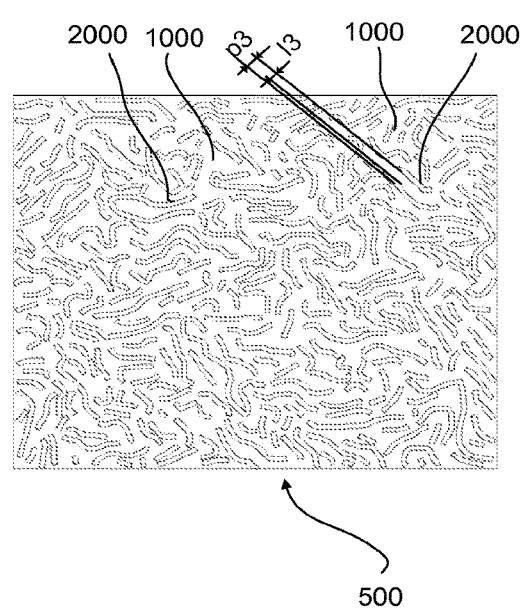

In addition, according to an advantageous feature of the invention, and as can be seen more clearly in FIGS. 5a and 5b, the surface of an inter-groove zone 500 between two adjacent grooves 100 is provided with air evacuation furrows 1000 that communicate with one another and are uniformly distributed over the area between two grooves 100. The furrows 1000 communicate with one another and also with the grooves 100. The furrows 1000 have a mean width l3, a depth h3 and are spaced apart at a mean spacing p3, where l3<l2, h3<h2 and p3<p2.

The furrows 1000 are made in the form of a jumble of curved lines etched into the surface of an inter-groove area 500. More particularly, the furrows 1000 (recessed parts) and the ribs 2000 (relief parts) are curved lines that are intermingled with one another. The furrows 1000 communicate with one another either by being in the continuation of one another, or by intersecting one another, or when bifurcations or bridges are provided between two adjacent furrows. Two exemplary embodiments of such patterns are illustrated in FIGS. 5a and 5b. The furrows 1000 have a width l3 equal to or slightly greater than that of the ribs 2000, and it is thus possible to define the pattern in terms of the density of the furrows, which is greater than 50% and for example between 50 and 60% compared with that of the striations 2000. The dimensional parameters of the slots 30 uniformly distributed over the surface of the bladder are: the spacing p1, the values of which are between 10 and 35 mm, the width l1 of between 1 and 1.5 mm, and the depth h1 of between 1 and 1.5 mm.

The dimensional parameters of the grooves 100 uniformly distributed over the surface of the bladder or over that of an inter-slot zone 50 are: the spacing p2, the values of which are between 2 and 5 mm, the width l2 of between 0.5 and 1 mm, and the depth h2 of between 0.4 and 1 mm.

The dimensional parameters of the furrows 1000, which are, for their part, uniformly distributed over the surface of an inter-groove zone 500, are: the mean spacing p3, the values of which are between 0.2 and 1 mm, the mean width l3 of between 0.1 and 0.5 mm, and the depth h3 of between 0.01 and 0.4 mm. The mean spacing and mean width are understood to be the arithmetical mean values of the distances and widths, respectively, of the furrows 1000 in an inter-groove zone 500.

Thus, an inter-groove zone 500 of hexagonal shape has a surface area of between 3.5 and 22 mm$^2$ and an inter-groove zone 500 in the form of a parallelogram has a surface area of between 15 and 157 mm$^2$. The external surface of the curing bladder 7 is thus divided into small inter-groove zones 500, each being provided with fine furrows 1000 of shallow depth for channelling air towards the grooves 100. The grooves collect the air from the furrows and evacuate it towards the slots 30 or, when the latter are absent, towards the beads of the bladder.

In a first example of the first embodiment, the relief structure of the external surface of the curing bladder 7 comprises a plurality of parallel grooves 100, as can be seen in FIG. 3, and furrows 1000 of the type illustrated in FIG. 5a, which are provided between the grooves 100, the slots 30 being absent. For grooves 100 having a spacing p2 of 4 mm, a width l2 of 0.8 mm and a depth of 0.3 mm and furrows having a spacing p3 of 0.4 mm, a width of 0.2 mm and a depth of 0.1 mm, the calculated external projected area of the bladder increases by 124% and the volume of air drained by 191% compared with a standard bladder (meaning a bladder of the same dimensions provided only with slots 30).

When, in a second exemplary embodiment of the bladder according to this first embodiment, slots 30 having a spacing of 10 mm, a width of 1.2 mm and a depth of 0.8 mm are added, the calculated external projected area of the bladder increases by 123% and the volume of air drained increases by 403% compared with a standard bladder.

In a first example of the second embodiment, the relief structure of the external surface of the curing bladder 7 comprises a plurality of honeycomb grooves 100, as can be seen in FIG. 4, and furrows 1000 of the type illustrated in FIG. 5b, which are provided between the grooves 100, the slots 30 being absent. For a honeycomb structure on the external surface of the bladder, this surface is understood to be divided into patches that are each in the form of a regular hexagon, wherein two series of adjacent patches in the form of a regular hexagon meet at their bases. The regular hexagons of the honeycomb structure form inter-groove zones 500 in relief that are separated by recessed grooves 100.

It is, of course, possible to provide an inter-groove zone 500 according to the first embodiment illustrated in FIG. 3 with furrows 1000 provided in the pattern illustrated in FIG. 5b and that according to the second embodiment illustrated in FIG. 4 with furrows 1000 that are provided in the pattern illustrated in FIG. 5a.

For grooves 100 having a spacing p2 of 4 mm, a width l2 of 0.8 mm and a depth of 0.3 mm and furrows having a spacing p3 of 0.4 mm, a width of 0.2 mm and a depth of 0.1 mm, the calculated external projected area of the bladder increases by 132% and the volume of air drained by 235% compared with a standard bladder (meaning a bladder of the same dimensions provided only with slots 30). When, in a second exemplary embodiment of the bladder according to this second embodiment, slots 30 having a spacing of 10 mm, a width of 1.2 mm and a depth of 0.8 mm are added, the calculated external projected area of the bladder increases by 129% and the volume of air drained increases by 436% compared with a standard bladder.

The furrows 1000 and the grooves 100 are made by chemical etching on the surface of the core 15, the slots 30 being made by mechanical machining.

During the inflation of the curing bladder 7 within the green tyre, it initially bears against an annular part situated in the equatorial plane E of the green tyre. More specifically, the ribs 2000 of the inter-groove zones 500 of this annular equatorial part bear against the green tyre, making it possible for the air included in the furrows 1000 to be discharged into the network of grooves 100. When the bladder is fully opened out, the entire external surface of the curing bladder 7 bears against the internal surface of the green tyre 2, the air captured on the sub-millimetre scale by the furrows 1000 of each inter-groove zone 500 is channelled towards the grooves 100 and progressively evacuated via the slots 30, when they are present, or only via the network of grooves 100, towards the beads 8, 9 of the curing bladder. In this way, progressive evacuation of the volume of air captured at the furrows is obtained at the bladder. This allows the volume of air captured at any point to change over time by being drained over the entire surface of the bladder, and thus makes it possible to obtain easier evacuation of the drained air.

In one variant, the external surface of the curing bladder is covered with a non-stick coating, for example of the type produced on the basis of a silicone composition which hardens in the presence of water, having a thickness of between 15 and 30 μm.

Other variants and embodiments of the invention can be envisaged without departing from the scope of its claims.

Thus, it is possible to use any other type of tiling of the surface of the curing bladder instead of hexagonal tiling, for example tiling using equilateral triangles or squares, or combining polygons of all kinds, which are not necessarily regular.

The invention claimed is:

1. A curing bladder for a tire, the curing bladder having a shape of revolution about a central axis and having a flexible wall made of crosslinked rubber, an external surface of which is intended to come into contact with an internal surface of a green tire during curing, the external surface having a relief structure having a plurality of air evacuation channels,
   wherein the relief structure has first channels forming air evacuation grooves arranged at a distance p2 of between 2 and 5 mm from one another and having a depth h2 of between 0.4 and 1 mm, two adjacent grooves defining, between one another, an inter-groove zone having second channels forming air channelling furrows made so as to communicate with one another and with at least one of the air evacuation grooves, the furrows each having a depth h3 of between 0.01 and 0.4 mm and being situated at a distance of between 0.2 and 1 mm from one another.

2. The curing bladder according to claim 1, wherein the inter-groove zone further comprises ribs, and wherein the air channelling furrows and the ribs are made in the form of curved lines intermingled with one another.

3. The curing bladder according to claim 2, wherein a sum of the areas of the air channelling furrows is greater than a sum of the areas of the ribs in the inter-groove zone.

4. The curing bladder according to claim 1, wherein the air evacuation grooves are rectilinear and mutually parallel, being arranged at one and the same distance p2 from one another.

5. The curing bladder according to claim 1, wherein the air evacuation grooves define a honeycomb structure, the honeycomb structure being made up of a plurality of regular hexagons with a height equal to p2.

6. The curing bladder according to claim 1 further comprising a plurality of mutually parallel slots that are arranged at a predetermined distance p1 from one another, where p1>p2, and are made so as to communicate with at least one air evacuation groove.

7. The curing bladder according to claim 6, wherein the slots extend between two beads of the curing bladder or between a bead and a zone close to in an equatorial plane of the curing bladder.

8. A process for manufacturing a bladder according to claim 1 comprising the steps of:
   inserting a block of rubber between a fixed rigid core imprinted with a pattern and two movable rigid shells of a vulcanizing press,
   vulcanizing the rubber in the vulcanizing press to form the bladder,
   extracting the bladder from the vulcanizing press, and
   turning the bladder inside out so that the relief structure obtained by the pattern on the core is on the external surface of the bladder,
   wherein the air evacuation grooves and the air channelling furrows of the relief structure are obtained by the pattern on the core obtained by at least one chemical etching operation on an external surface of the fixed rigid core.

9. A process for curing a green tire in a curing mold having rigid molding parts comprising the steps of:
   arranging the green tire and the curing bladder according to claim 1 in the curing mold, and expanding the bladder such that the external surface of the bladder is in contact with the internal surface of the tire during the curing.

\* \* \* \* \*